US009405312B2

(12) United States Patent
Stachniak et al.

(10) Patent No.: US 9,405,312 B2
(45) Date of Patent: Aug. 2, 2016

(54) ACTIVE CONTROL COLUMN WITH MANUALLY ACTIVATED REVERSION TO PASSIVE CONTROL COLUMN

(75) Inventors: Darryl S. Stachniak, Chicago, IL (US); Thomas M. Rusak, Skokie, IL (US)

(73) Assignee: Woodward MPC, Inc., Skokie, IL (US)

( * ) Notice: Subject to any disclaimer, the term of this patent is extended or adjusted under 35 U.S.C. 154(b) by 1436 days.

(21) Appl. No.: 12/845,246

(22) Filed: Jul. 28, 2010

(65) Prior Publication Data

US 2012/0025031 A1 Feb. 2, 2012

(51) Int. Cl.

| | |
|---|---|
| ***G05G 5/03*** | (2008.04) |
| ***B64C 13/12*** | (2006.01) |
| ***B64C 13/50*** | (2006.01) |
| ***G05G 11/00*** | (2006.01) |

(52) U.S. Cl.

CPC *G05G 5/03* (2013.01); *B64C 13/12* (2013.01); *B64C 13/503* (2013.01); *G05G 11/00* (2013.01); *Y10T 29/49716* (2015.01)

(58) Field of Classification Search

CPC .......... G05G 5/03; G05G 11/00; B64C 13/12; B64C 13/503; Y10T 29/49716

USPC .......................... 244/223, 224, 229, 236, 234

See application file for complete search history.

(56) References Cited

U.S. PATENT DOCUMENTS 3,902,379 A 9/1975 Bennett et al.
4,473,203 A 9/1984 Barnoin et al.
4,688,443 A 8/1987 Fabre et al.
4,716,399 A 12/1987 Nordlund
5,149,023 A 9/1992 Sakurai et al.
5,456,428 A 10/1995 Hegg
5,900,710 A 5/1999 Gautier et al.
6,128,554 A * 10/2000 Damotte ........................... 701/4
6,572,055 B1 6/2003 Bernard
6,659,218 B2 * 12/2003 Thomas et al. ............... 180/402
7,559,510 B1 7/2009 Bae et al.

(Continued)

FOREIGN PATENT DOCUMENTS

CN 101370701 A 2/2009
EP 1 918 196 A1 5/2008

(Continued)

OTHER PUBLICATIONS

U.S. Appl. No. 12/845,160, filed Jul. 28, 2010, Stachniak et al.

(Continued)

*Primary Examiner* — Valentina Xavier

(74) *Attorney, Agent, or Firm* — Reinhart Boerner Van Deuren P.C.

(57) ABSTRACT

An active control column transitionable to a fully passive state for an aircraft and methods of use are provided. The control column includes a passive feedback arrangement, a stick and a ground lock mechanism is provided. The passive feedback arrangement is moveable relative to a mechanical ground to adjust a feedback profile provided to the stick. The stick is movable relative to the mechanical ground and the passive feedback arrangement. The ground lock mechanism has a locked state in which the passive feedback arrangement is maintained in a fixed position relative to the mechanical ground. This places the control column in a fully passive state. The ground lock mechanism also has a normal state in which the passive feedback arrangement is permitted to move relative to the mechanical ground such that active feedback can be provided to the stick.

16 Claims, 2 Drawing Sheets

(56) References Cited

U.S. PATENT DOCUMENTS

| | | | | |
|---|---|---|---|---|
| 7,648,106 | B2 * | 1/2010 | Granier et al. | 244/223 |
| 8,589,029 | B2 * | 11/2013 | Egenfeldt | 701/42 |
| 2002/0135327 | A1 | 9/2002 | Szulyk et al. | |
| 2003/0183440 | A1 | 10/2003 | Thomas et al. | |
| 2008/0142642 | A1 * | 6/2008 | Marino et al. | 244/223 |
| 2009/0125166 | A1 * | 5/2009 | Johnson et al. | 701/3 |
| 2009/0234518 | A1 * | 9/2009 | Irwin et al. | 701/4 |
| 2009/0314901 | A1 | 12/2009 | Granier et al. | |

FOREIGN PATENT DOCUMENTS

| | | | |
|---|---|---|---|
| FR | 2 558 136 | A1 | 7/1985 |
| GB | 126568 | | 5/1919 |
| GB | 827089 | | 2/1960 |
| GB | 925471 | | 5/1963 |
| GB | 2465761 | A | 6/2010 |
| GB | 2482407 | A | 2/2012 |
| JP | 2000-264292 | A | 9/2000 |
| JP | 2008204098 | A | 2/2007 |
| WO | WO 2006/018027 | A2 | 2/2006 |

OTHER PUBLICATIONS

U.S. Appl. No. 12/844,867, filed Jul. 28, 2010, Szulyk et al.

U.S. Appl. No. 12/910,193, filed Oct. 22, 2010, Burroughs et al.

U.S. Appl. No. 12/976,723, filed Dec. 22, 2010, Scott et al.

* cited by examiner

ACTIVE CONTROL COLUMN WITH MANUALLY ACTIVATED REVERSION TO PASSIVE CONTROL COLUMN

FIELD OF THE INVENTION

This invention generally relates to control columns for aircrafts and more particularly fly-by-wire control columns for aircrafts.

BACKGROUND OF THE INVENTION

As the performance requirements of both civil and military aircraft increases, conventional control technologies using mechanical linkages cannot relieve the pilot from higher mental and manual control activity. As such, today's high performance aircraft as well as some transport aircraft use "fly-by-wire" sidesticks and center sticks also referred to as "control columns".

These fly-by-wire control columns simulate tactile feedback relating to the control surfaces of the aircraft to the control columns.

In a "passive" control column, the pilot feels spring or damper forces according to the applied deflection of a stick of the control column relative to mechanical ground. The deflection of the stick is the control input from the pilot to a flight control computer (FCC) relating to the desired pitch and/or roll The tactile forces are realized by a spring and damper package operably acting on the stick. In such a passive control column, the pilot's controller forces (i.e. tactile feel) are usually fixed.

A drawback of this passive control concept, as opposed to conventional controllers, is that the pilot loses the contact with the control surfaces of the aircraft and loses contact with the second pilot in the cockpit. As such, the pilot loses tactile information and can only use visual cues to inform him about the actual flight state and available trim control power as well as what the other pilot is doing. Further drawbacks relate to the fact that the feedback profile cannot be adjusted to compensate for other changes in the flight state of the aircraft or control surfaces such as due to changes in, for example, altitude, weather, or mechanical failures of the control surfaces.

In a "direct drive active" control column, the pilot experiences a simulated control force through the use of elaborate servo systems alone. In the direct drive active control system, a motor, drive electronics, and a high bandwidth closed loop force and damping control algorithm are used to provide the tactile feedback directly to the stick simulating the tactile feedback of the control surfaces of aircraft. By using this high bandwidth system, the system is expensive and bulky due to the increased number of sensors, and the complexity of the control system. Further, it is contemplated that in these direct drive active systems, that if the motor fails or locks-up, the stick can become locked thereby preventing the pilot from controlling the aircraft. Alternatively, if the control electronics fail, no resistance may act against manipulation of the stick such that the pilots cannot properly or easily manipulate the deflection of the sticks to provide the desired inputs to the FCC. To correct for this, unnecessary redundancy must be built into the system to avoid the mechanical and/or electrical failures.

It is desired to provide an adjustable tactile feedback system for a control column that incorporates the benefits of an active system but that can be transitioned to a passive system in the event of failure in the active portion of the control column.

BRIEF SUMMARY OF THE INVENTION

In one aspect, the invention provides a control column that has improved abilities to manually convert the control column from an active control column into a passive control column that provides tactile feedback in the event of failure of an active portion of the control column. In a more particular embodiment, the control column can be reverted from an active indirect drive control column to a fully passive control column.

In one embodiment, a control column for an aircraft including a passive feedback arrangement, a stick and a ground lock mechanism is provided. The passive feedback arrangement is moveable relative to a mechanical ground to adjust a feedback profile provided to the stick. The stick is movable relative to the mechanical ground and the passive feedback arrangement. The ground lock mechanism has a locked state in which the passive feedback arrangement is maintained in a fixed position relative to the mechanical ground. The ground lock mechanism also has a normal state in which the passive feedback arrangement is permitted to move relative to the mechanical ground.

In one embodiment, the control column further includes an actuator operably coupled to the passive feedback arrangement when the ground lock mechanism is in the normal state to move the passive feedback arrangement relative to the mechanical ground.

Additionally, the ground lock mechanism is not an actuator configured to move the passive feedback arrangement relative to the mechanical ground during normal operation.

In a further embodiment, the actuator is operably de-coupled from the passive feedback arrangement when the ground lock mechanism is in the locked state such that the actuator does not inhibit movement of the passive feedback arrangement relative to the mechanical ground.

In a further embodiment, the ground lock mechanism further includes an intermediate transition state in which the passive feedback arrangement is permitted to move relative to the mechanical ground and the actuator is operably de-coupled from the passive feedback arrangement such that the passive feedback arrangement can be moved relative to the mechanical ground independent of the actuator. This allows the passive feedback arrangement to be moved relative to the mechanical ground in the event of mechanical failure of the actuator and the actuator is locked. Thus, if such mechanical failure occurs, the ground lock mechanism can be moved to the locked state.

In one embodiment, the ground lock mechanism and the passive feedback arrangement include a catch arrangement therebetween. In the normal state and the intermediate state the catch arrangement is decoupled such that the ground lock mechanism does not inhibit movement of the passive feedback arrangement relative to mechanical ground and in the locked state the catch arrangement is coupled such that the ground lock mechanism fixes the position of the feedback arrangement relative to the mechanical ground.

In one embodiment, the catch arrangement includes a lock member and a cooperating receiving member that includes a receiving cavity. The lock member is maintained out of the receiving cavity in the normal and intermediate states. The lock member is inserted into the receiving cavity in the locked state fixing the position of the passive feedback arrangement relative to the mechanical ground.

In one embodiment, a biasing mechanism acts on the locking member. The biasing member biases the locking member toward the receiving member. A blocking mechanism prevents the biasing mechanism from biasing the locking member into the receiving cavity in the normal state. Manipulation of the blocking member allows the biasing member to bias the locking member into the receiving cavity in the locked state.

In one embodiment, the receiving member includes an abutment surface surrounding the receiving cavity. In the intermediate state, the locking member is biased against the abutment surface. The locking member slides along the abutment surface as the ground lock mechanism transitions from the intermediate state to the locked state.

In one embodiment, the stick is indirectly coupled to the actuator through the passive feedback arrangement such that the stick is permitted to move relative to the actuator and/or the mechanical ground through the passive feedback arrangement in both the normal and locked states.

In one embodiment, the passive feedback arrangement includes a cam providing a cam surface and a resistance arrangement acting on the cam. The stick includes a cam follower that interacts with the cam surface. Movement of the cam follower along the cam surface varies the biasing force applied to the stick via the resistance arrangement.

In one embodiment, the passive feedback arrangement includes a gimbal arrangement that is movable relative to mechanical ground. The stick and gimbal arrangement are pivotable about a common axis. The cam member is carried by the gimbal arrangement and is movable relative thereto. The resistance arrangement acts between the gimbal arrangement and the cam member when the stick is moved along the cam surface.

In one embodiment, the passive feedback assembly is fixed at a ground neutral position when the ground lock mechanism is in the locked state. However, the stick remains movable relative to the mechanical ground as well as a feedback neutral position of the passive feedback mechanism.

In one embodiment, the passive feedback assembly is displaced from the ground neutral position when the ground lock mechanism is in the intermediate state.

Embodiments of the present invention provide methods of converting, typically manually, a control column from being an active control column to a passive control column that provides, typically only, passive feedback to a stick of the control column. The method includes transitioning a ground lock mechanism of the control column between a normal state in which a passive feedback arrangement is permitted to move relative to a mechanical ground and a locked state in which the passive feedback arrangement is maintained in a fixed position relative to the mechanical ground. The stick is permitted to move relative to the mechanical ground and the passive feedback arrangement in both the normal and the locked states through the passive feedback arrangement.

In a particular method, the method further comprises the steps of decoupling an actuator, which is operably coupled to the passive feedback arrangement when the ground lock mechanism is in the normal state to move the passive feedback arrangement relative to the mechanical ground, from the passive feedback arrangement such that the passive feedback arrangement can be transitioned relative to the mechanical ground independent of the actuator.

In one embodiment, the method further comprises the step of engaging a catch arrangement provided by the feedback arrangement and the ground lock mechanism to transition the ground lock mechanism into the locked state.

In one embodiment, the catch arrangement includes a first catch member and a second catch member. The step of transitioning the ground lock mechanism between the normal and locked states includes an intermediate state wherein the actuator is de-coupled from the actuator and the passive feedback arrangement is permitted to move relative to the mechanical ground.

In another embodiment, the first and second catch members abut one another in the intermediate state. The method further comprises the step of sliding the first and second catch members relative to one another in abutted contact until the catch arrangement is engaged and the ground lock mechanism is in the locked state.

In one embodiment, the step of engaging the catch arrangement includes inserting a lock member into a receiving cavity of a receiving member. When the lock member is inserted into the receiving cavity, the lock member prevents movement of the passive feedback arrangement relative to the mechanical ground.

In another embodiment, the method further includes the step of biasing the lock member toward the receiving cavity with a biasing member and blocking movement of the lock member toward the receiving cavity using a blocking member when in the normal state and unblocking movement of the lock member toward the receiving cavity by transitioning the block member to a new state when in the locked state.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
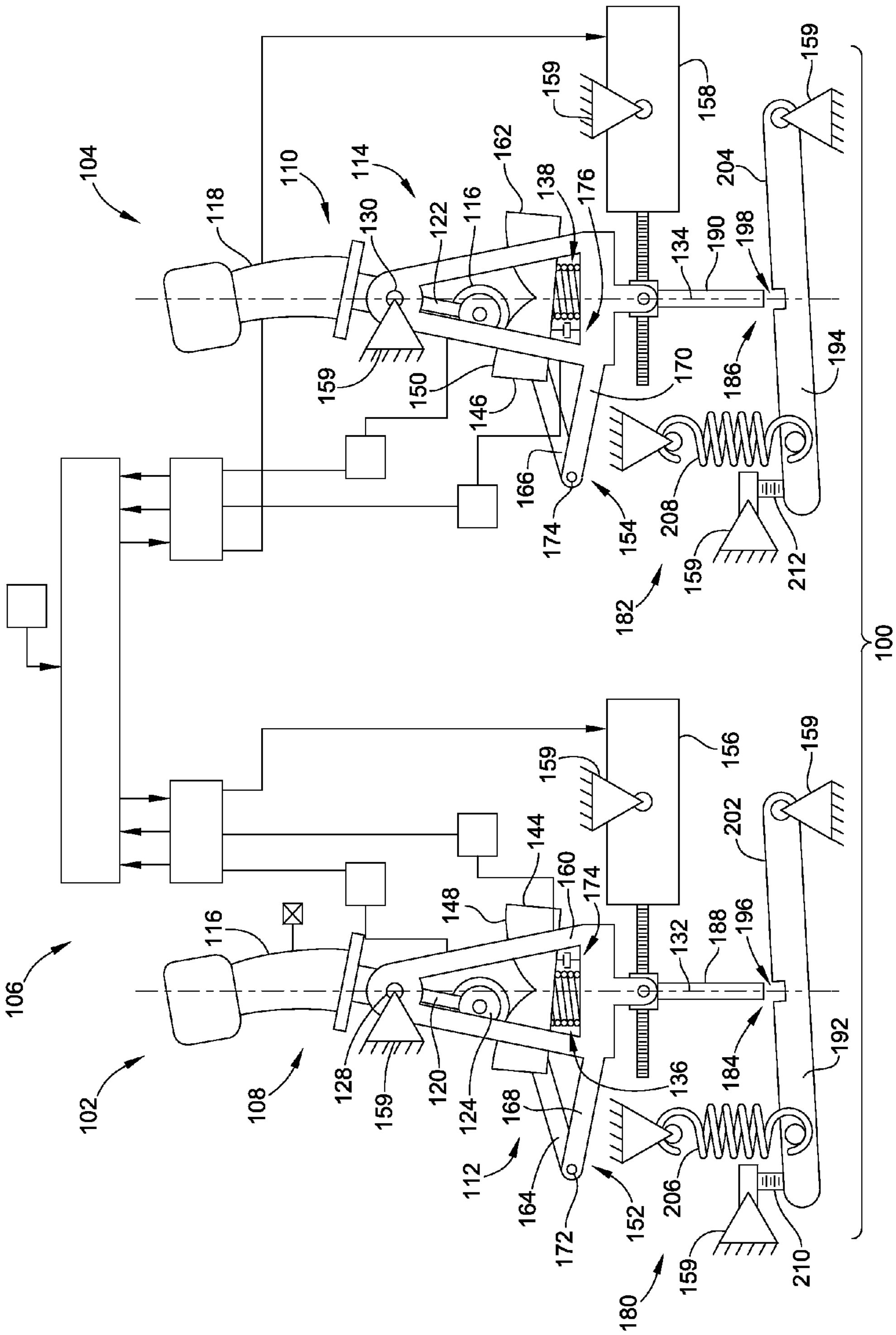
FIG. 1 is a schematic representation of a control system including a pair of control columns according to an embodiment of the present invention with the control columns in a normal state where both passive and active feedback is provided to the sticks of the columns.

FIG. 1 is a simplified schematic illustration of an aircraft control system 100 for controlling pitch, roll or both pitch and roll of an aircraft. The aircraft control system 100 generally includes first and second control columns 102, 104 (referred to generically as "control columns 102, 104"). The control columns 102, 104 are used by the pilots (e.g. pilot and co-pilot) to control various operation of the aircraft such as pitch, roll and/or pitch and roll.

The control columns 102, 104 are considered fly-by-wire control columns because the manipulation of the control columns to adjust the pitch and/or roll of the aircraft is not translated directly to the control surfaces of the aircraft by mechanical devices. Instead, the deviations of the control columns from neutral positions are sensed and then converted into electrical signals. These signals are then sent to actuators which use the electrical signals to make proportional changes in the control surfaces of the aircraft.

Because the control columns 102, 104 are not mechanically linked to the control surfaces, the control system 100 incorporates tactile feedback that is applied to the control columns 102, 104 to simulate the feeling that a pilot would get if the control columns 102, 104 were in fact mechanically coupled to the control surfaces. For instance, if the pilots request a large degree of pitch or roll, the tactile feedback would increase the amount of force the pilots would have to apply to the control columns to implement that change in the control surfaces. As such, a large degree of deviation in the current control of the aircraft would be executed by applying a large force to the corresponding control column by the pilots.

The control columns 102, 104 generally include first and second sticks 108, 110 (i.e. pilot and copilot sticks) with which the pilots input control signals relating to desired pitch and/or roll. The first and second sticks 108, 110 interact with first and second feedback assemblies 112, 114 to provide tactile feedback. The columns 102, 104 are coupled to an electronic control arrangement 106 that controls the dynamic adjustments of the feedback assemblies 112, 114.

Each feedback assembly 112, 114 provides the tactile feedback to its corresponding stick 108, 110. In some embodiments, this tactile feedback has two components, a passive component and an active component.

Typically, the passive component, i.e. a first portion of the tactile feedback, relates to the flight state, i.e. the amount of pitch or roll the pilot is requesting due to the amount of stick deflection from a neutral position. In one embodiment, the active component, i.e. the second portion of the tactile feedback, relates to conflicts between the two different control columns 102, 104. More particularly, the feedback assemblies 112, 114 provide tactile feedback when the two sticks 108, 110 are not at the same position relative to a mechanical ground, i.e. the pilots are providing conflicting control commands to the aircraft. However, other systems could provide active tactile feedback based on other inputs such as changes in characteristics of the aircraft such as changes in altitude, icing of the control surfaces, failure or reduced functionality of the actuators controlling the control surfaces, etc.

The control columns 102, 104 of this embodiment are substantially identical. Stick 108 generally includes a first grip portion 116 and stick 110 includes a second grip portion 118. The pilots manually manipulate the grip portions 116, 118 to control the desired amount of pitch and/or roll. Grip portion 116 is operably coupled to a first connecting rod 120 and grip portion 118 is operably coupled to second connecting rod 122. The connecting rods 120, 122 are operably coupled to or include one of first and second cam followers 124, 126, respectively (illustrated as rollers in the present embodiment). The cam followers 124, 126 interact with the corresponding feedback assembly 112, 114 to provide a variable tactile feedback profile to the sticks 108, 110.

The sticks 108, 110 pivot about a corresponding one of a first or a second common pivot point 128, 130 relative to a corresponding one of a first and a second ground neutral position 132, 134. The angular displacement of the sticks 108, 110 relative to the corresponding ground neutral position 132, 134 is proportional to the amount of pitch or roll that the pilot is requesting, i.e. proportional to the amount of change in the position of the corresponding control surfaces of the aircraft.

In general, the feedback assemblies 112, 114 provide tactile feedback to the pilot by providing resistance to the movement of the sticks 108, 110 from the ground neutral position 132, 134. In one embodiment, the feedback assemblies 112, 114 are indirect drive active feedback assemblies. This allows the system to provide both the active and passive feedback. The feedback assemblies 112, 114 utilize passive feedback as the first form of tactile feedback, which, as mentioned above, typically, relates to the control state of the sticks 108, 110. This relates to the amount of pitch and/or roll requested and simulates attachment to the control surfaces of the aircraft. This passive feedback is provided by resistance arrangements 136, 138 (i.e. a spring and damper package) that opposes the rotational movement of stick 108, 110 from a feedback neutral position by using one or more springs and/or dampers or other biasing devices.

In typical embodiments, the resistance profile of the resistance arrangement increases the greater the amount of angular displacement or deflection of the sticks 108, 110 from the feedback neutral position, which happens to be neutral position 132, 134 in the illustrated embodiment. This resistance provides feedback to the pilot such that when the pilot requests a certain amount of pitch or roll, the pilots muscle memory will tend to apply a certain amount of pushing or pulling force to overcome the force of the springs and dampers of the resistance arrangements 136, 138. Thus, the pilots will "learn" how much force is needed for control of the aircraft, i.e. how much force is used to adjust the position of the sticks 108, 110 relative to ground neutral 132, 134 for a given amount of pitch and/or roll.

The feedback assemblies 112, 114, in the illustrated embodiment, include a profiled first or second cam 144, 146 that has first and second V-shaped cam surfaces 148, 150, respectively, with which the cam followers 124, 126 interact. As the cam followers 124, 126 transition away from the center, i.e. bottom of the "V", of the cam surfaces 148, 150, the resistance arrangements 136, 138 increase the angular force applied to the corresponding stick 108, 110 to provide tactile feedback to the pilot.

The center point of cam surfaces 148, 150 can also be referred to as a "feedback neutral position" or a "gimbal neutral position", because in this position, no rotational force is being applied to the sticks 108, 110 by the feedback assemblies 112, 114. In one embodiment, in the feedback neutral position, the cam followers 124, 126 will contact both sides of the corresponding V-shaped cam surface 148, 150, such that no rotational force is applied to the sticks 108, 110 by the feedback assemblies 112, 114. In FIG. 1, the feedback neutral position is illustrated as being substantially aligned with the ground neutral positions 132, 134.

The first and second cams 144, 146 in combination with the first and second resistance arrangements 136, 138 can be referred to as passive centering mechanisms as the forces generated thereby attempt to always drive the sticks 108, 110 toward the center of the cams 144, 146, which correspond to the feedback neutral positions.

In some embodiments, the aircraft control system 100 is also configured to provide active tactile feedback to the pilots when there is a discrepancy of the control input between the two different sticks 108, 110. A discrepancy occurs when one pilot is trying to request a different degree of pitch and/or roll than the other pilot. This can be represented using the second form of tactile feedback identified above, the active tactile feedback.

In one embodiment, the feedback assemblies 112, 114 are configured to attempt to maintain the first and second sticks 108, 110 in a same position relative to mechanical ground 159 when one pilot's actions cause a discrepancy in position between the two sticks 108, 110.

To provide active tactile feedback to one stick 108, 110 relating to the operation of the other stick 110, 108, the feedback assemblies 112, 114 include one of movable first and second gimbals 152, 154 that are driven by a corresponding one of first and second actuators 156, 158 to adjust the position of first and second cams 144, 146 relative to the mechanical ground 159. The adjustment of the position of the cams 144, 146 relative to mechanical ground 159 actively adjusts the force feedback profile relative to mechanical ground 159. Thus, different force can be applied to the corresponding sticks 108, 110 by the corresponding feedback assembly 108, 110 when the sticks 108 110 are moved relative to mechanical ground.

In the illustrated embodiment, actuators 156, 158 are illustrated as linear actuators pivotally coupled to the mechanical ground 159 and pivotally coupled to gimbals 152, 154. However, other actuators could be used such as rotary actuators positioned, for example, at pivot points 128, 130 or motors having gears that act on corresponding gearing of gimbals 152, 154. Other types of drive mechanisms could be used for adjusting the position of the gimbals 152, 154 relative to mechanical ground 159.

Further, because the passive feedback portion, i.e. the resistance arrangements 136, 138, corresponding gimbals 152, 154, cams 144, 146 are interposed between the actuators 156, 158 and sticks 108, 110, this provides an indirect drive because the actuators 156, 158 are not directly coupled to the sticks 108, 110. Thus, the sticks 108, 110 may move, to at least some degree, independent of the actuators 156, 158. Thus, there is at least a limited or biased degree of freedom between the sticks 108, 110 and their corresponding feedback assemblies 112, 114. As such, if the actuators 156, 158 were to lock up or to be controlled to a fixed state, the sticks 108, 110 are still be able to move relative to mechanical ground 159 allowing the pilots to still make adjustments in the control state of the aircraft.

Gimbals 152, 154 are rotationally mounted to the mechanical ground 159 for rotation about first and second common pivot points 128, 130, respectively. As such, the stick 108, 110 and the gimbal 152, 154 of a given control column 102, 104 are permitted to rotate about a corresponding common axis provided by the respective common pivot point 128, 130.

In the illustrated embodiment, the gimbals 152, 154 include gimbal frames 160, 162. The first and second cams 144, 146 are movably carried by gimbal frames 160, 162. In the illustrated embodiment, the first and second cams 144, 146 include cam connecting arms 164, 166 that pivotally connect to first and second gimbal frame arms 168, 170. The first and second cams 144, 146 and first and second gimbal frames 160, 162 rotate relative to one another through the pivotal connections 172, 174 therebetween to adjust the amount of force being applied to the first and second sticks 108, 110 due to adjustments in the compression or expansion of the biasing mechanisms within resistance arrangements 136, 138.

However, other means for allowing the cams 144, 146 to move relative to gimbal frames 160, 162 could be provided. For instance, the cams 144, 146 could be free floating and merely attached to the end of the resistance arrangements 136, 138. Alternatively, the cams 144, 146 could be mounted for linear sliding along the gimbal frames 160, 162.

The resistance arrangements 136, 138 provide dampers 174, 176 that add damping to the system. In the illustrated embodiment, the resistance arrangements 136, 138 and particularly the dampers thereof are interposed between the sticks 108, 110 and the gimbals 152, 154. While other embodiments could interpose portions of the resistance arrangements 136, 138, and particularly the dampers 174, 176, between the mechanical ground 159 and the sticks 108, 110, this embodiment does not do so as it provides the added benefit of isolating the effect of the dampers 174, 176 from actuators 156, 158. As such, in this embodiment, the resistance arrangements 136, 138 and particularly the dampers 174, 176 thereof do not work against actuators 156, 158 as the actuators 156, 158 adjust the position of the gimbals 152, 154 relative to mechanical ground 159.

By placing the resistance arrangement between the sticks 108, 110 and the gimbals 152, 154, the actuators 156, 158 drive the sticks 108, 110 through the passive feedback portions of the feedback assemblies 112, 114, but, absent pilot input, the resistance arrangements 136, 138 and particularly dampers 174, 176 thereof do not oppose the motion of the actuators 156, 158.

The dampers 174, 176 could be rotary fluidic damping modules. Alternatively, they could be linear style fluid dampers. Other dampers, such as electronic dampers could also be incorporated.

More particular control of the positioning of the cams 144, 146 relative to mechanical ground is described in co-pending application assigned to the assignee of the instant application, entitled Position Control System for Cross Coupled Operation of Fly-By-Wire Control Columns, application Ser. No. 12/844,867 filed on Jul. 28, 2010, the teachings and disclosure of which are incorporated herein by reference thereto.

In one embodiment, by actively adjusting the position of the gimbals 152, 154, and consequently the corresponding cams 144, 146 thereof about the common pivot points 128, 130, the resistance or feedback profile relative to neutral positions 132, 134 and mechanical ground 159 applied to the corresponding sticks 108, 110 is actively altered providing modified tactile feedback to the pilot.

This active adjustability can be used to indicate a discrepancy between the commands provided by the two sticks 108, 110. This adjustability in the force profile can also be used to attempt to maintain the two sticks 108, 110 in a common location when one pilot inputs such a control discrepancy by providing a corrective force to the moved stick that compensates for the increased force applied by the pilot trying to deviate from the other stick. Further, this active adjustability in the resistance or feedback profile can also be used to simulate other changes in the aircraft such as changes in the control surfaces, changes or failures in the actuators that control the control surfaces, icing of the control surfaces, changes in altitude, etc.

Figure 2:
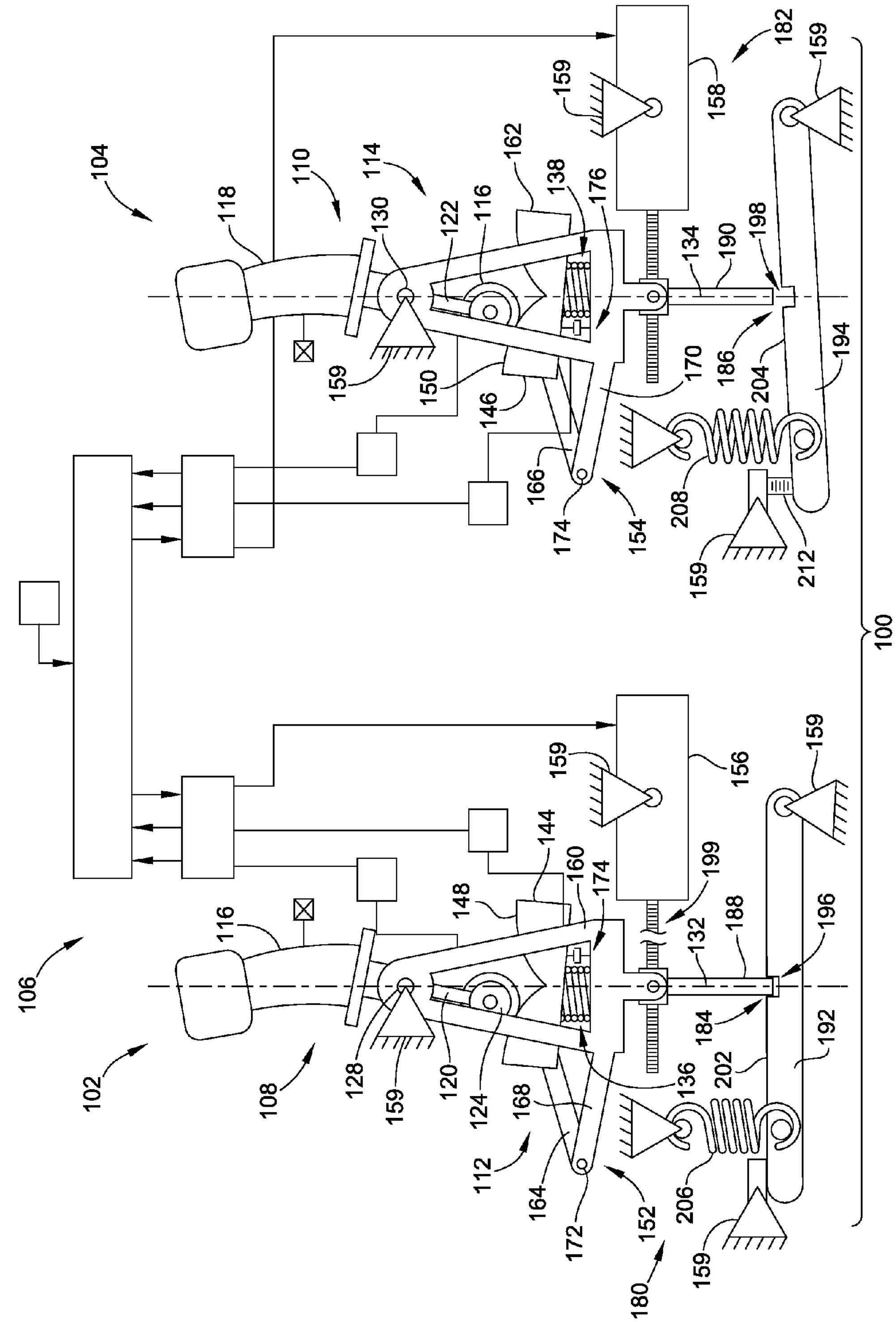
FIG. 2 is a schematic representation of the control system of FIG. 1 with one of the control columns in a locked state such that it provides only passive feedback to the stick of the control column.

The illustrated embodiment o FIGS. 1 and 2 illustrate a further feature. The illustrated control columns 102, 104 are configured to be able to transition from providing active feedback and passive feedback to only providing passive feedback. As noted above to provide active feedback, the gimbals 152, 154 are moved relative to mechanical ground 159 to adjust the feedback profile provided by the cams 144, 146.

In the fully passive configuration where only passive feedback is provided, a ground lock mechanism 180, 182 locks the position of the gimbal, and consequently feedback assemblies 112, 114 relative to mechanical ground 159.

This allows passive resistance to be applied to the sticks 108, 110 in the event of failure in the position control of the gimbals 152, 154. Typically, these systems are configured such that the mean time between failure is based on a determination that the electrical components will fail first. In such a situation, if the electrical components, such as control system 106 fails first, no power would be provided to actuators 156, 158 such that the gimbals 152, 154 will not be fixed relative to ground. Instead, movement of sticks 108, 110 will be substantially uninhibited as the actuators will provide substantially zero resistance to movement of the gimbals 152, 154. With out the gimbals 152, 154 grounded, movement of the sticks 108, 110 will not be opposed by the resistance arrangements 136, 138 but will simply cause movement of the gimbals 152, 154 along with the sticks. As such, it will be very difficult of the pilots to control pith and/or roll because they will not have the "learned" resistance or tactile feel acting against their adjustments in position of the sticks 108, 110 relative to mechanical ground 159.

Alternatively, if the actuators mechanically fail, the actuator could lock the position of the gimbals 152, 154 in an undesirable position. If the actuators 156, 158 stall, the ground lock mechanisms 180, 182 can be configured to operably decouple the actuators 156, 158 from the gimbals 152, 154 such that the gimbal 152, 154 coupled to the failed actuator 156, 158 can be transitioned to a desired location, typically where the feedback neutral position aligns with the ground neutral positions 132, 134, and then the gimbal 152, 154 can be locked in that position.

In a normal state, the ground lock mechanisms 180, 182 are disengaged such that the gimbals 152, 154 are free to move relative to mechanical ground, such as under operation by actuators 156, 158. However, upon failure, the ground lock mechanisms 180, 182 can both or independently be transitioned to a locked state in which the ground lock mechanisms 180, 182 lock the position of the gimbals 152, 154 relative to mechanical ground (see control column 102 in FIG. 2.

In the illustrated embodiments, the ground lock mechanisms 180, 182 and the gimbals 152, 154 include a catch arrangement 184, 186 that operably couples and decouples to transition between the locked state (see column 102 in FIG. 2) and the normal state (see FIG. 1).

The catch arrangements 184, 186 include first and second catch members illustrated in the forms of lock members 188, 190 and receiving members 192, 194 that include receiving cavities 196, 198. In the locked state the corresponding lock members 188, 190 engages the corresponding receiving cavities 196, 198 of which ever column 102, 104 fails. When the lock members 188, 190 engage the receiving members 192, 194 the gimbals 152, 154 are grounded and prevented from moving relative to mechanical ground 159 no matter the operational state of actuators 156, 158.

In the event of failure when the gimbals 152, 154 are offset from ground neutral positions 132, 134 or otherwise such that the locking members 188, 190 will not align with receiving cavities 196, 198, the ground lock mechanisms 180, 182 are configured such that the actuators 156, 158 can be decoupled from the gimbals 152, 154, in the event of failure. This allows the pilot to manually position the gimbals, by using the control sticks 108, 110, to align the locking members 188, 190 with the receiving cavities 196, 198 even if the actuators 156, 158 have mechanically stalled.

This decoupling is illustrated by break 199 in FIG. 2 for control column 102. While the break is illustrated as completely disconnecting the actuators 156, from gimbal 152, other mechanisms could be implemented. For instance, the coupling between mechanical ground 159 and actuator 156 could be removed such that the actuator 156 itself could be moved relative to mechanical ground. However, this will be considered to be decoupling the actuator from the gimbal because this decouples the grounding effect that the motor has by grounding the gimbal to mechanical ground 159. Alternatively, other means decoupling the gimbal 152 from actuator 156 could occur such that the drive shaft of the actuator can be disconnected from actuator 156. As such, any means of removing the link between the gimbal and the mechanical ground through the actuator 156 is to be considered as "decoupling the actuator 156 from the gimbal 152.

Once the actuator 156 is decoupled from the gimbal 152, the pilot can manipulate the gimbal 152 to the ground neutral position by moving the stick 108. This occurs because of the interaction of the cam follower 124 with the cam surface 148 of cam 144. As the pilot deflects stick 108, a load will be applied to cam 144 causing the gimbal 152 to transition as well. Once the receiving cavity 196 and the locking member 188 align, the two will engage locking the gimbal 152 in the desired position and only passive feedback will be available as provided by the resistance arrangement 136 and cam 144.

In some embodiments, the ground lock mechanisms 180, 182 may have an intermediate state where the gimbals 152, 154 are free to move relative to mechanical ground 159 and they are decoupled from actuators 156, 158. During this intermediate state, the gimbals 152, 154 are transitioned toward the locked state. In some embodiments, the catch members may be biased into one another. In such an intermediate state, in the illustrated embodiment, the lock members 188, 190 may abut against the receiving members 192, 194 and slide across abutment surfaces 202, 204 thereof. This will allow the pilot to move the sticks 108, 110 back and forth until the lock members 188, 190 actually get inserted into receiving cavities 196, 198.

The ground lock mechanisms 180, 182 include biasing members 206, 208 configured to bias the two catch members towards one another, i.e. lock members 188, 190 and receiving members 192, 194 toward one another. In the illustrated embodiment the biasing members 206, 208 are illustrated in the form of coil springs in tension. However other springs or biasing members in tension or compression could be used.

To prevent undesirable engagement between the lock members 188, 190 and the receiving members 192, 194 during normal operation and to maintain the ground lock mechanism in the normal state, block members 210, 212 interfere with the movement of the receiving members 192, 194 toward the lock members 188, 190 via biasing members 206, 208.

To transition the control columns 102, 104 between the active state and a fully passive state, the pilots can manually move the blocking members 210, 212 so that the receiving members 192, 194 are no longer prevented from moving towards locking members 188, 190 under load provided by biasing members 206, 208.

As noted above, if the locking members 188, 190 are not aligned with receiving cavities 196, 198, the biasing members will bias receiving members 192, 194 into abutment with locking members 188, 190. The pilots deflect the sticks 108, 110 back and forth about common axes 128, 130 to align the components. The abutted components will slide relative to one another and when the locking members 188, 190 align with the receiving cavities 196, 198 the biasing members 206, 208 will cause the components to engage and lock the position of gimbals 152, 154. Once engaged, the sticks 108, 110 will only experience passive feedback and the feedback profile cannot be adjusted.

While it is illustrated as the gimbals 152, 154 include the pin or peg like locking members 188, 190, the catch arrangements 184, 186 could be switched such that the gimbals 152, 154 are the receiving members and include the receiving cavities.

Further, the receiving members 192, 194, 196 could be tapered proximate the receiving cavities 196, 198 so as to assist in biasing or directing the locking members 188, 190 into the receiving cavities 196, 198.

Typically, the blocking members 210, 212 will be manually removed from to prevent the interference with the engagement between the catch members. This manual actuation may be provided by a push-push type cable arrangement. In one embodiment, the handle of the push-push cable can include indication devices for clearly illustrating to the pilot that the individual column 102, 104 has been transitioned into a fully passive state. This could be done by having the pilot rotate the handle of the push-push cable 90 degrees so that it has a different appearance. Also, this rotation could cause the handle to be aimed at an indicator that states that the column 102, 104 is in the fully passive mode.

While typically the blocking members 210, 212 are manually removed, the removal of blocking members 210, 212 could be automated.

Additionally, while the receiving members 192, 194, i.e. members used to lock the gimbals 152, 154, are illustrated as being pivotally coupled to mechanical ground 159, they could be linearly slidable relative to mechanical ground. For instance, the movable mechanism of the ground lock mechanisms could be provided by a linearly movable pin that engages an receiving cavity formed in the gimbals 152, 154. In a more particular embodiment, the biasing members could be a compression spring around the pins biasing the pin towards gimbals 152, 154. In such an implementation, the blocking members have been contemplated to be c-clips that are generally fork shaped that partially extend around the pin and interfere with the action of the compression springs biasing of the pin.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A control column for an aircraft comprising:

a passive feedback arrangement moveable relative to a mechanical ground;

a stick movable relative to the mechanical ground; and a ground lock mechanism having a locked state in which the passive feedback arrangement is maintained in a fixed position relative to the mechanical ground and a normal state in which the passive feedback arrangement is permitted to move relative to the mechanical ground;

an actuator operably coupled to the passive feedback arrangement when the ground lock mechanism is in the normal state to move the passive feedback arrangement relative to the mechanical ground; and wherein the ground lock mechanism further includes an intermediate transition state in which the passive feedback arrangement is permitted to move relative to the mechanical ground and the actuator is operably de-coupled from the passive feedback arrangement such that the passive feedback arrangement can be moved relative to the mechanical ground independent of the actuator.

2. The control column of claim 1, wherein the ground lock mechanism and the passive feedback arrangement include a catch arrangement therebetween, in the normal state and the intermediate state the catch arrangement is decoupled such that the ground lock mechanism does not inhibit movement of the passive feedback arrangement and in the locked state the catch arrangement is coupled such that the ground lock mechanism fixes the position of the feedback arrangement relative to the mechanical ground.

3. The control column of claim 2, wherein the catch arrangement includes a lock member and a cooperating receiving member that includes a receiving cavity, wherein the lock member is maintained out of the receiving cavity in the normal and intermediate states and lock member is inserted into the receiving cavity in the locked state fixing the position of the passive feedback arrangement relative to the mechanical ground.

4. The control column of claim 3, further comprising a biasing mechanism acting on the locking member biasing the locking member toward the receiving member and further comprising a blocking mechanism preventing the biasing mechanism from biasing the locking member into the receiving cavity in the normal state and allowing the biasing member to bias the locking member into the receiving cavity in the locked state.

5. The control column of claim 3, wherein the receiving member includes an abutment surface surrounding the receiving cavity and wherein in the intermediate state the locking member is biased against the abutment surface in the intermediate state, the locking member sliding along the abutment surface as the ground lock mechanism transitions from the intermediate state to the locked state.

6. A control column for an aircraft comprising:

a passive feedback arrangement moveable relative to a mechanical ground;

a stick movable relative to the mechanical ground;

a ground lock mechanism having a locked state in which the passive feedback arrangement is maintained in a fixed position relative to the mechanical around and a normal state in which the passive feedback arrangement is permitted to move relative to the mechanical ground; and an actuator operably coupled to the passive feedback arrangement when the ground lock mechanism is in the normal state to move the passive feedback arrangement relative to the mechanical ground;

wherein the stick is indirectly coupled to the actuator through the passive feedback arrangement such that the stick is permitted to move relative to the actuator through the passive feedback arrangement in both the normal and locked states.

7. A control column for an aircraft comprising:

a passive feedback arrangement moveable relative to a mechanical ground;

a stick movable relative to the mechanical ground; and a ground lock mechanism having a locked state in which the passive feedback arrangement is maintained in a fixed position relative to the mechanical ground and a normal state in which the passive feedback arrangement is permitted to move relative to the mechanical ground;

an actuator operably coupled to the passive feedback arrangement when the ground lock mechanism is in the normal state to move the passive feedback arrangement relative to the mechanical ground;

wherein the stick is indirectly coupled to the actuator through the passive feedback arrangement such that the stick is permitted to move relative to the actuator through the passive feedback arrangement in both the normal and locked states; and wherein the passive feedback arrangement includes a cam providing a cam surface and a resistance arrangement acting on the cam, the stick includes a cam follower that interacts with the cam surface, movement of the cam follower along the cam surface varies the biasing force applied to the stick via the resistance arrangement.

8. The control column of claim 7, wherein the passive feedback arrangement further includes a gimbal arrangement movable relative to mechanical ground, the stick and gimbal arrangement pivotable about a common axis, the cam member carried by the gimbal arrangement and being movable relative thereto, the resistance arrangement acting between the gimbal arrangement and the cam member when the stick is moved along the cam surface.

9. The control column of claim 1, wherein the passive feedback assembly is fixed at a ground neutral position when the ground lock mechanism is in the locked state.

10. The control column of claim 9, wherein the passive feedback assembly is displaced from the ground neutral position when the ground lock mechanism is in the intermediate state.

11. A control column for an aircraft comprising:

a passive feedback arrangement moveable relative to a mechanical ground;

a stick movable relative to the mechanical ground; and a ground lock mechanism having a locked state in which the passive feedback arrangement is maintained in a fixed position relative to the mechanical ground and a normal state in which the passive feedback arrangement is permitted to move relative to the mechanical ground; and wherein the ground lock mechanism and the passive feedback arrangement include a catch arrangement therebetween, in the normal state the catch arrangement is decoupled such that the ground lock mechanism does not inhibit movement of the passive feedback arrangement and in the locked state the catch arrangement is coupled such that the ground lock mechanism fixes the position of the feedback arrangement relative to the mechanical ground.

12. A method of converting a control column from being an active control column to a passive control column that provides passive feedback to a stick of the control column, comprising the steps of:

transitioning a ground lock mechanism of the control column between a normal state in which a passive feedback arrangement is permitted to move relative to a mechanical ground and a locked state in which the passive feedback arrangement is maintained in a fixed position relative to the mechanical ground, wherein the stick is permitted to move relative to the mechanical ground and the passive feedback arrangement in both the normal and the locked states through the passive feedback arrangement;

decoupling an actuator, which is operably coupled to the passive feedback arrangement when the ground lock mechanism is in the normal state to move the passive feedback arrangement relative to the mechanical ground, from the passive feedback arrangement such that the passive feedback arrangement can be transitioned relative to the mechanical ground independent of the actuator; and engaging a catch arrangement provided by the feedback arrangement and the ground lock mechanism to transition the ground lock mechanism into the locked state.

13. The method of claim 12, wherein the catch arrangement includes a first catch member and a second catch member, wherein the step of transitioning the ground lock mechanism between the normal and locked states includes an intermediate state wherein the actuator is de-coupled from the actuator and the passive feedback arrangement is permitted to move relative to the mechanical ground.

14. The method of claim 13, wherein the first and second catch members abut one another in the intermediate state and the method further comprises the step of sliding the first and second catch members relative to one another in abutted contact until the catch arrangement is engaged and the ground lock mechanism is in the locked state.

15. The method of claim 12, wherein the step of engaging the catch arrangement includes inserting a lock member into a receiving cavity of a receiving member, wherein when the lock member is inserted into the receiving cavity, the lock member prevents movement of the passive feedback arrangement relative to the mechanical ground.

16. The method of claim 15, further comprising the step of biasing the lock member toward the receiving cavity with a biasing member and blocking movement of the lock member toward the receiving cavity using a blocking member when in the normal state and unblocking movement of the lock member toward the receiving cavity by transitioning the block member to a new state when in the locked state.

* * * * *